United States Patent [19]
Hahn

[11] Patent Number: 5,626,496
[45] Date of Patent: May 6, 1997

[54] CIGARETTE LIGHTER ADAPTER WITH FLEXIBLE DIAMETER

[75] Inventor: Stan S. Hahn, Moraga, Calif.

[73] Assignee: Asian Micro Sources, Inc., Moraga, Calif.

[21] Appl. No.: 414,208

[22] Filed: Mar. 30, 1995

[51] Int. Cl.$^6$ ................................................ H01R 17/18
[52] U.S. Cl. ........................................ 439/668; 439/592
[58] Field of Search ................................ 439/668, 638, 439/218, 669, 354, 592

[56] References Cited

U.S. PATENT DOCUMENTS

| | | |
|---|---|---|
| 4,988,315 | 1/1991 | Wharton . |
| 5,170,067 | 12/1992 | Baum et al. ........................ 439/668 |
| 5,199,904 | 4/1993 | Wharton . |
| 5,201,677 | 4/1993 | Takayama ........................ 439/668 |

*Primary Examiner*—Neil Abrams
*Assistant Examiner*—Eugene Byrd
*Attorney, Agent, or Firm*—Adam H. Tachner; Nathan P. Koenig; Crosby, Heafey, Roach & May

[57] ABSTRACT

An electrical adapter plug insertable into cigarette lighter-type sockets of varying diameters. The plug features a flexible dimpled member integrally joined with the periphery of the plug to provide a variable outer plug diameter. An internal spring provides an outwardly biasing force to increase resistance against vibration and jarring and improve retention of the plug within the socket.

11 Claims, 3 Drawing Sheets

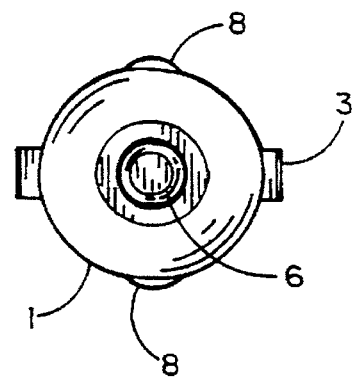
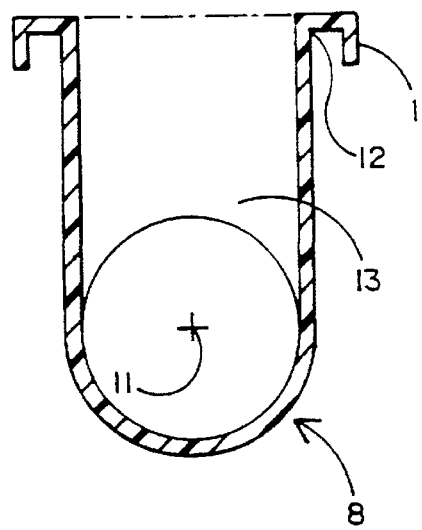
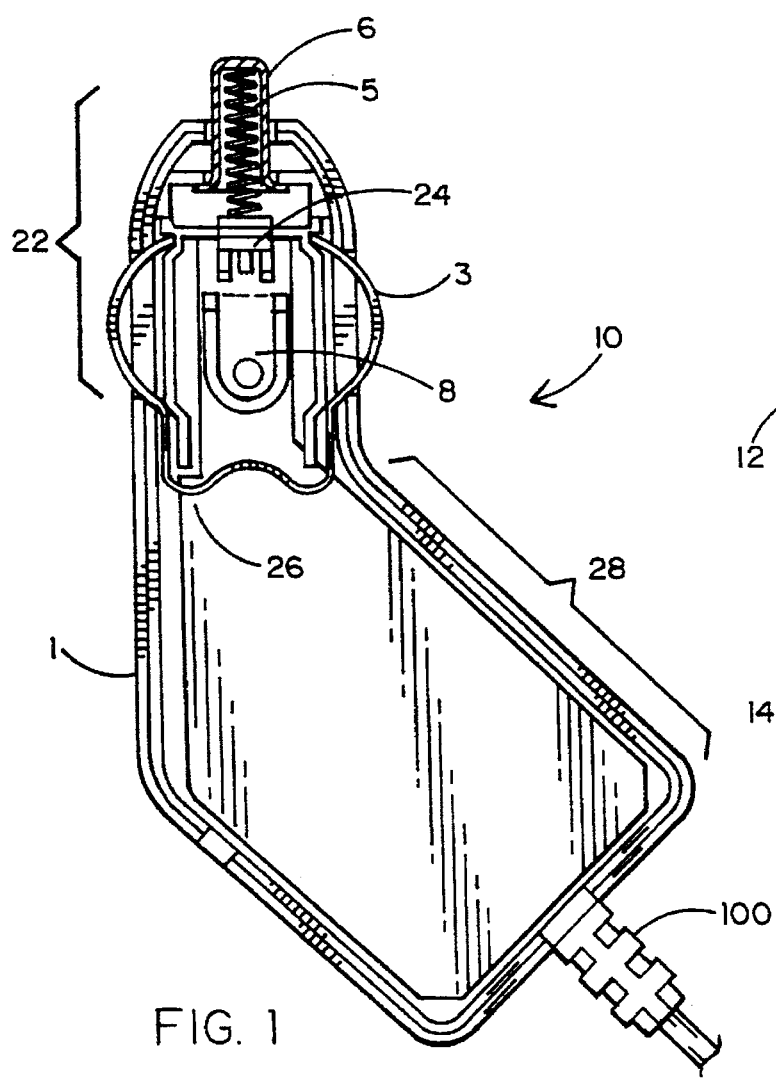
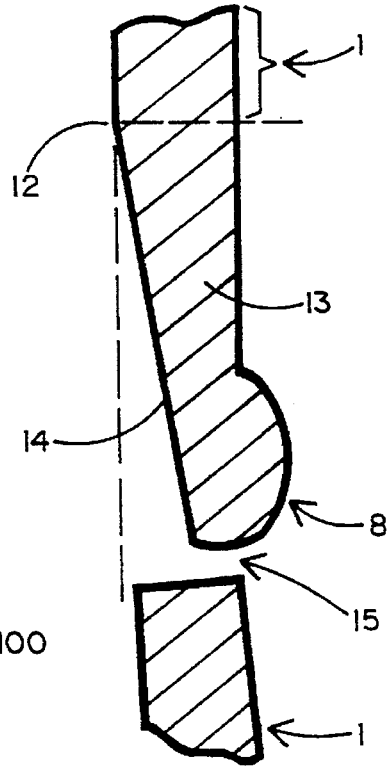
FIG. 2
FIG. 4a
FIG. 1
FIG. 4b

CIGARETTE LIGHTER ADAPTER WITH FLEXIBLE DIAMETER

FIELD OF THE INVENTION

This invention relates to electrical connecting devices, particularly to an electrical adapter plug that may be inserted into the socket or receptacle of a direct-current electrical system cigarette lighter assembly to operate various electrical loads.

BACKGROUND OF THE INVENTION

In recent years, a great variety of electrical appliances have become available for operation by the low voltage power of direct-current electrical systems found in vehicles. Such appliances are generally interconnected to the electrical system by use of an adapter plug or connector, which is inserted into a cigarette lighter socket or receptacle. Electrical appliances and accessories that can be operated from a vehicle electrical system include battery chargers, portable televisions, cellular phones and the like.

There are generally two standard diameters of cigarette lighter sockets. The American and Japanese standard is about 20.9 millimeters, while the European standard is about 22.3 millimeters. Known adapter plugs are designed for use with only one standard receptacle size. Each prior art design includes by necessity dimensions tailored to the particular socket size intended for use. It is therefore desirable to design an adapter plug that is compatible with a plurality of standard sizes and which will not loosen or eventually lose electrical contact when subject to vibration or shock when positioned within any of the standard socket diameters.

In general, existing adapter plug designs each have only one or two spring contacts for mating with the socket receptacle. Some plug designs have placed contacts in varying positions around the plug surface to provide an offset force and thereby more soundly hold the plug in place.

If there are two or more contacts, they are typically angularly spaced around the periphery of an adapter plug. For example, U.S. Pat. No. 4,988,315 to Wharton, incorporated herein in its entirety by reference, discloses an adapter plug having two spring contacts radially positioned opposite each other at an angle of less than 180 degrees.

Another prior art design includes a cylindrical plug sleeve which slidably fits around the tubular adapter plug body perimeter to broaden the diameter of the plug body. However, the plug sleeve presents the user with the inconvenience of determining whether use of the sleeve is necessary, locating the sleeve and inserting the sleeve over the plug body in the proper position. Also, the sleeve adds a significant cost to the manufacture and shipment of the adapter plug.

Thus, none of these designs self-adjusts to a variation in the diameter of the socket. In a larger socket, a plug designed for a smaller diameter will be free to pivot around the contact points which is likely to cause the plug to loosen and eventually break electrical contact with the electrical system when subjected to vibration or jarring. Conversely, a plug designed for a larger diameter will not fit into a small standard sleeve size.

SUMMARY OF THE INVENTION

It is therefore a principal object of this invention is to greatly improve the retention of an adapter plug within a receptacle sleeve.

Another object of this invention is to attain a more reliable electrical connection between an adapter plug and its socket or retention sleeve in response to intense vibration or severe jarring.

A further object of this invention is to greatly improve the retention of an adapter plug within a receptacle sleeve regardless of minor variations in the standard diameter of such receptacle sleeves.

Still another object of this invention is to reduce pivoting of an adapter plug within a receptacle sleeve despite vibration and jarring of the plug relative to the sleeve.

Yet another object of this invention is to provide an electrical adapter plug comprising a cylindrically shaped housing, an electrical contact at one axial end of said housing and at least one additional electrical contact at the radial surface of said housing for connection to corresponding contacts within a hollow cylindrical connector, a mechanical compensator for providing a selected minimum frictional engagement between the housing and the connector despite differences in respective diameters of the housing and the connector to assure proper electrical interface between the plug contacts and the connector contacts. The mechanical compensator comprises a base member formed integrally with said radial surface, a tip member nominally extending away from said housing for engagement with said connector, and an elongated member integral to said base member and to said tip member and being flexible for limited radial movement relative to said housing.

The invention features a novel dimple, flexibly and integrally located on the periphery of an adapter plug body. The flexibly mounted dimple establishes improved mating contact with the cylindrical socket of a cigarette lighter receptacle when the adapter plug is inserted into the receptacle. Moreover, the improved mating characteristics of this invention are retained despite variations in standard receptacle sleeve diameter.

A preferred embodiment of the invention, includes two integral, flexible dimples. The dimples are preferably disposed diametrically opposite one another on the periphery of the adapter plug body, but may be disposed at various smaller angles. When used in conjunction with spring loaded electrical contacts, a plurality of contact points with the receptacle sleeve are formed.

BRIEF DESCRIPTION OF THE DRAWINGS

In order that all of the structural features for attaining the objects of this invention may be readily understood, reference is herein made to the drawings wherein:

FIG. 1 is a cross-sectional view of the adapter plug of the present invention.

FIG. 2 is a top view of the adapter plug of the present invention.

FIG. 4A is a close-up view of the dimple feature of the present invention.

FIG. 4B is a cross-sectional close-up view of the dimple feature of the present invention.

DETAILED DESCRIPTION OF THE PREFERRED EMBODIMENT

Figure 3:
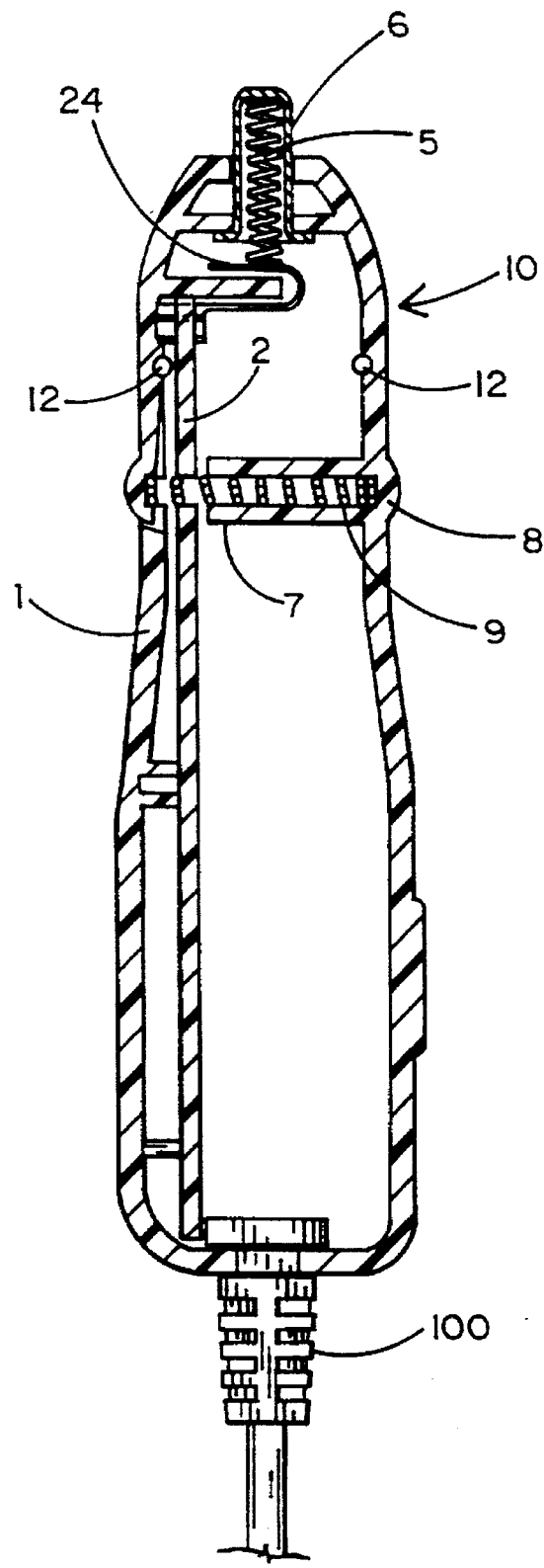
FIG. 3 is a cross-sectional view of the adapter plug of the present invention rotated ninety degrees relative to the view of FIG. 1.

A preferred embodiment of electrical adapter plug 10 of the invention is shown in FIG. 1. The principal novel structural feature of this embodiment resides in the use of flexible dimples 8, flexibly and integrally located on the periphery of adapter plug casing 1. Biased outwardly from casing 1, the flexibly mounted dimples establish improved mating contact with the electrically conducting surfaces of a cylindrical sleeve of a cigarette lighter receptacle, such as shown in FIGS. 5B and 5C, when the adapter plug 10 is inserted into the receptacle sleeve in order to power an electric device connected to chord 100.

To provide electrical connection between the adapter plug 10 and a receptacle sleeve, retractable side electrical contacts 3 and tip contact 6 are located on either side of and on top of casing 1, respectively. These establish electrical contact with the receptacle sleeve conducting surfaces. Contacts 3 are preferably formed from a unitary strip of conductive material, shaped to provide an outward bias away from casing 1 in a manner known to a skilled artisan. Tip contact 6 is also outwardly biased by central contact spring 5, fastened to central connector 24. The key electrical components of the adapter plug are located on circuit board 2, predominantly within lower portion 28 of casing 1. Side contacts 3 are connected to lower connector 26. Tip contact 6 is electrically connected to central connector 24 via contact spring 5. Connectors 24 and 26 are electrically connected to circuit board 2. Cable 100, also connected to circuit board 2, completes the transmission of electrical power from the source, through the contacts and circuit board, and finally to the destination device.

Referring to FIG. 2, the top portion of a preferred embodiment of the present invention is shown in a fully relaxed state. Electrical contacts 3 and 6, as well as flexible dimpled members 8, will provide the necessary electrical and structural contact points, respectively, with a cigarette lighter sleeve receptacle to retain the desired electrical connection from the receptacle sleeve conducting surfaces to a device dependent on a DC power source.

To ensure proper fit of the plug 10 into a receptacle sleeve, when relaxed, the outer-most diameter of adapter plug 10 preferably exceeds slightly the largest internal diameter of standard receptacle sleeves. Similarly, the fully compressed diameter of the plug is preferably the same as or sightly less than the smallest internal diameter of standard receptacle sleeves.

FIG. 3 illustrates a cross-sectional view of a preferred embodiment of the present invention rotated 90 degrees from the view of FIG. 1. Dimple biasing spring 9 provides an outward bias for flexible dimples 8. The biasing force of spring 9 augments the biasing force provided by the nature of the plastic connection between flexible dimple 8 and casing 1. The pre-shaped and preferred plastic casing will resist any compression force of a receptacle sleeve wall. Spring guiding extension 7, integral with either of the flexible dimples 8, provides lateral support for dimple biasing spring 9. Inward pressure from a receptacle sleeve on contacts 3 and 6 and on dimples 8 is absorbed by the various biasing members described above.

FIGS. 4A and 4B provide close-up views of dimple member 8, integral with casing 1. Tip portion 11 is preferably convex, but may be any shape compatible with the intended use of the dimple member, i.e., rounded or circular. Tip 11 provides a primary physical contact point with the receptacle sleeve. Hinge points 12 delineate the preferred pivot line of member 8 relative to casing 1 when tip 11 is subjected to inward pressure from a receptacle surface. Elongate portion 13 is integral with tip portion 11. As illustrated in FIG. 4B, elongate portion 13 is preferably long enough to allow flexing of the dimpled member without breakage. The actual length of elongate portion 13 is, therefore, dependent upon the material used to fabricate casing 1 and the thickness of the dimpled member. Elongate portion 13 is preferably tapered along interior surface 14 to provide member 8 increased flexibility and to avoid decreasing the interior diameter of casing 1 upon compression of flexible member 8. Gap 15 appears between member 8 and casing 1 to allow free movement of the tip and elongate portions relative to the casing. Gap 15 need not surround member 8 on three sides, but could, instead, merely provide free movement of tip portion 11 relative to casing 1 sufficient to extend and narrow the outer-most diameter of plug 10.

Figure 5A:
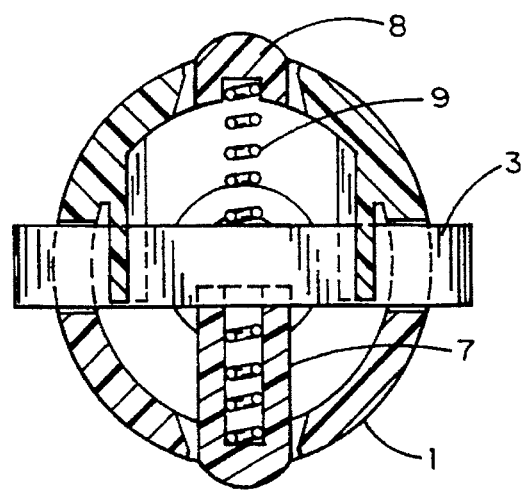
FIGS. 5A, 5B and 5C show a cross-sectional view of the adapter plug of the present invention outside of a receptacle in a relaxed state (5A), inserted into a large diameter receptacle and partially compressed (5B), and inserted into a small diameter receptacle and fully compressed (5C).
Figure 5B:
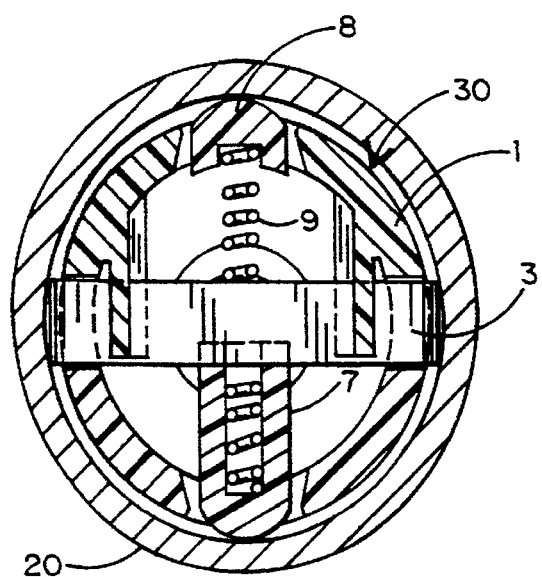
Figure 5C:
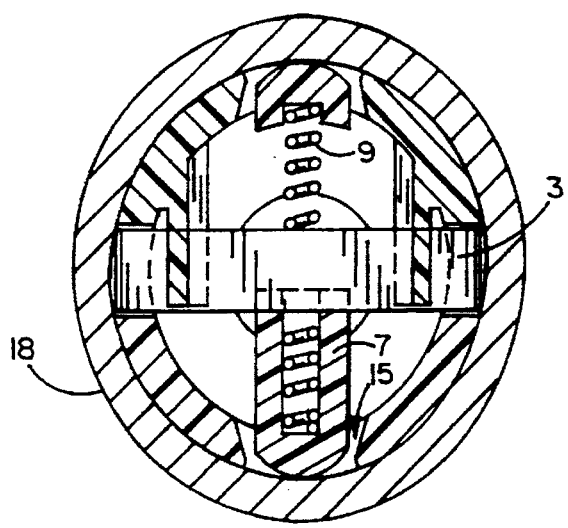

FIGS. 5A, 5B and 5C illustrate the inventive element of the present invention in various states of use. FIG. 5A provides a cross-sectional view of top portion 22 of casing 1 in a relaxed position, revealing dimpled members 8, biasing spring 9, spring guiding extension 7 and side contacts 3 fully extended outwardly from casing 1. As shown in FIG. 5B, when top portion 22 is inserted into large diameter receptacle sleeve 20, a plurality of contact points are created around the plug periphery of adapter plug 10, in contact with receptacle sleeve 20. Dimple members 8 and side contacts 3 are partially compressed in response to the inward force applied by sleeve 20. The plurality of contact points function to provide plug retention despite the existence of gap 30 between plug 10 and sleeve 20. The various biasing mechanisms and springs diminish pivoting of the plug within the receptacle sleeve and reduce the effects of vibration and jarring which might tend to pull the plug out of the receptacle sleeve. Thus, though the fully relaxed outer diameter of plug 10 preferably exceeds a standard sleeve size, the plug will securely fit within the sleeve when inserted.

Similarly, as shown in FIG. 5C, when top portion 22 is inserted into small diameter receptacle sleeve 18, a continuous contact line or plurality of contact points is created around the periphery of casing 1 within receptacle sleeve 18. The various biasing mechanisms and springs provide the outward force necessary to hold plug 10 within receptacle 18 until the user desires to remove the plug.

A general description of the device of the present invention as well as a preferred embodiment of the present invention has been set forth above. One skilled in the art will recognize and be able to practice many changes in many aspects of the device described above, including variations that fall within the teachings of this invention. The spirit and scope of the invention should be limited only as set forth in the claims which follow.

What is claimed is:

1. An electrical adapter plug comprising:

a cylindrically shaped housing;

an electrical contact at one axial end of said housing and at least one additional electrical contact at the radial surface of said housing for connection to corresponding contacts within a hollow cylindrical connector;

a non-conductive mechanical compensator for providing a selected minimum frictional engagement between the housing and the connector despite differences in respective diameters of the housing and the connector, to assure proper electrical interface between the plug contacts and the connector contacts, said mechanical compensator comprising:

a base member formed integrally with said radial surface, a tip member nominally extending away from said housing for engagement with said connector; and an elongated member integral to said base member and to said tip member and being flexible for limited radial movement relative to said housing.

2. The electrical adapter of claim 1, wherein said elongated member is connected to said housing only at said base member.

3. The electrical adapter of claim 1, wherein said tip member comprises a generally rounded exterior surface.

4. The electrical adapter of claim 1, wherein said tip member is circular.

5. The electrical adapter of claim 1, wherein said tip member is convex.

6. The electrical adapter of claim 1, wherein the diameter of said tip member is less than one-half the length of said elongated member.

7. The electrical adapter of claim 1, wherein said elongated member includes a tapered interior surface.

8. The electrical adapter of claim 1, wherein said elongated member is comprised of plastic.

9. The electrical adapter of claim 1, wherein said plug comprises a cigarette lighter adapter plug.

10. An electrical adapter plug having a generally tubular body insertable into a socket to establish electrical contact between the plug and the socket, comprising:

a retractable contact projecting beyond the periphery of the plug body to establish electrical contact between said contact and the socket interior surface, and a flexible elongated non-conductive dimpled member, integrally formed with and projecting beyond the periphery of the plug body, shaped to provide an outward force against said socket when the plug is inserted therein.

11. In an electrical adapter plug of the type having a cylindrically shaped housing with an electrical contact at one axial end thereof and at least one additional electrical contact at the radial surface thereof for connection to corresponding contacts within a hollow cylindrical connector, an improvement comprising a non-conductive mechanical compensator for providing a selected minimum frictional engagement between the housing and the connector despite differences in respective diameters of the housing and the connector, to assure proper electrical interface between the plug contacts and the connector contacts; the mechanical compensator comprising:

a base member formed integrally with said radial surface, a tip member nominally extending away from said housing for engagement with said connector; and an elongated member integral to said base member and to said tip member and being flexible for limited radial movement relative to said housing.

\* \* \* \* \*